United States Patent

Raghavan et al.

[11] Patent Number: 5,836,850
[45] Date of Patent: Nov. 17, 1998

[54] FOUR SPEED POWER TRANSMISSION

[75] Inventors: Sekhar Raghavan; Kumaraswamy V. Hebbale, both of Troy, Mich.

[73] Assignee: General Motors Corporation, Detroit, Mich.

[21] Appl. No.: 869,260

[22] Filed: Jun. 4, 1997

[51] Int. Cl.$^6$ ....................................................... F16H 3/46
[52] U.S. Cl. ........................................................... 475/286
[58] Field of Search ............................................. 475/286

[56] References Cited

U.S. PATENT DOCUMENTS 5,692,988  12/1997  Bein et al. ................................ 475/286

Primary Examiner—Dirk Wright
Attorney, Agent, or Firm—Donald F. Scherer

[57] ABSTRACT

A simple planetary gearset, a compound pinion planetary gearset, two clutches and two brakes are combined to provide four forward speed ratios and a reverse ratio. One of the clutches provides an input connection while the other provides a planetary interconnection. The two brakes are connected with respective first and second members of the simple planetary gearset while the third member of the planetary is continuously driven by a power input. The compound pinion planetary gearset has one member continuously connected with a power output shaft, a second member connected with the input clutch and the interconnecting clutch, and a third member connected with one of the brakable members of the simple planetary gearset.

2 Claims, 1 Drawing Sheet

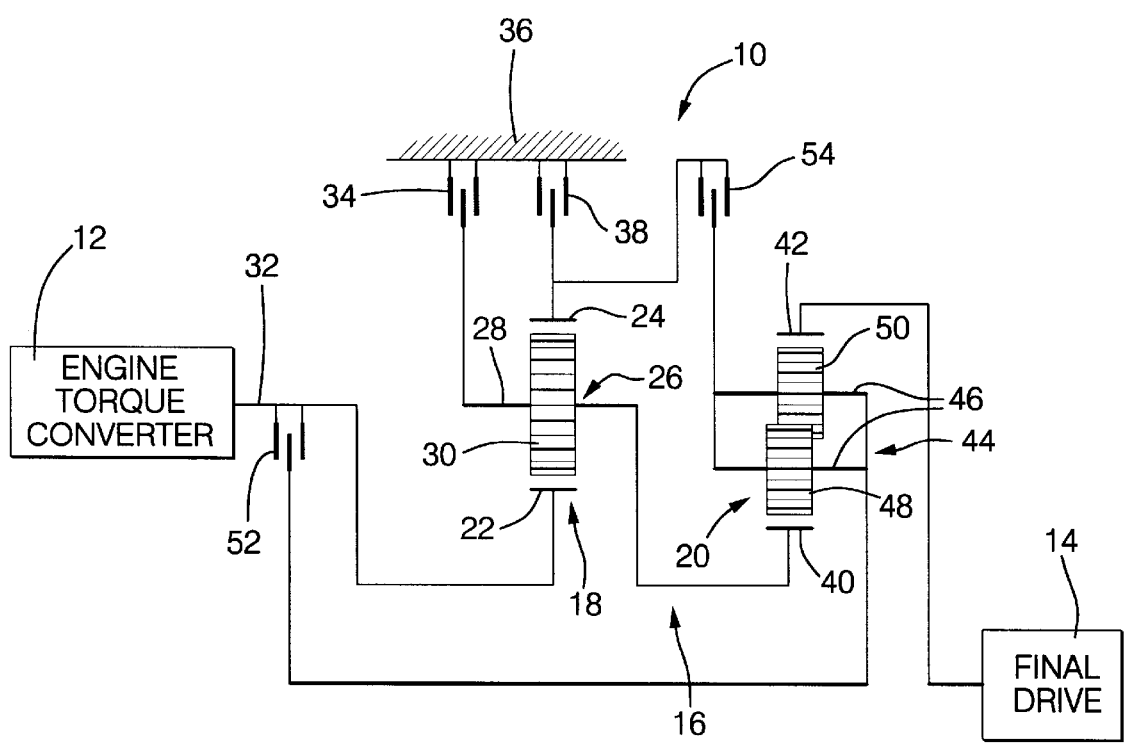

FOUR SPEED POWER TRANSMISSION

TECHNICAL FIELD

This invention relates to multi-speed power transmissions.

BACKGROUND OF THE INVENTION

In order to increase the performance and economy of automobiles, it has become necessary to increase the number of speed ratios provided by the transmission. The increased number of ratios permits the effective operating range of the engine to be used more effectively. In many instances, this allows for the use of a smaller engine with a given vehicle or a larger vehicle with a given engine. It also improves the fuel economy at highway speeds by permitting the engine to operate at a more efficient fuel consumption level.

SUMMARY OF THE INVENTION

It is an object of the present invention to provide an improved multi-speed power transmission.

In one aspect of the invention, the power transmission incorporates a simple planetary gearset having a continuous power input and a compound pinion planetary gearset having one member continuously drive connected with one member of the simple planetary gearset and another member continuously drive connected with an output shaft. An input clutch is selectively engageable to connect a member of the compound pinion planetary gearset with the power input shaft and a connecting clutch selectively interconnects the planetary gearsets.

In another aspect of the invention, the two clutches and two brakes combine with the two planetary gearsets to provide four forward speeds and one reverse speed.

In a further aspect of the invention, the transmission employs a minimum number of planetary gearsets (two) and a minimum number of friction devices (four) to establish four forward speed ratios and one reverse ratio.

BRIEF DESCRIPTION OF THE DRAWINGS

The drawing is a schematic diagram of a powertrain incorporated in the present invention.

DESCRIPTION OF AN EXEMPLARY EMBODIMENT

Referring to the drawing, there is seen a powertrain, generally designated 10, including an engine and torque converter power unit 12, a final drive unit 14 and a planetary gear arrangement 16 connected between the engine and torque converter 12 and the final drive 14. The planetary gear arrangement includes a simple planetary gearset 18 and a compound pinion planetary gearset 20.

The simple planetary gearset 18 has a sun gear 22, a ring gear 24 and a carrier assembly 26. The carrier assembly 26 includes pinion supports 28 and a plurality of pinion gears 30 rotatably supported on the pinion supports 28 and meshing with the sun gear 22 and the ring gear 24. The sun gear 22 is continuously connected for input from the engine torque converter 12 by an input shaft 32.

The carrier assembly 26 is operatively connected to a conventional fluid operated friction brake 34 which is, in turn, connected with a stationary transmission housing 36. The ring gear 24 is operatively connected with a conventional fluid operated friction brake 38 which is also grounded to the transmission housing 36. On application or engagement of either brake 34 or 38, the carrier assembly will be held stationary or the ring gear will be held stationary, respectively.

The compound planetary gearset 20 includes a sun gear 40, a ring gear 42 and a carrier assembly 44. The carrier assembly 44 has pinion supports 46 on which is supported a first pinion 48 and a second pinion 50. The pinion 48 meshes with the sun gear 40 and with the pinion 50 while the pinion 50 meshes with the pinion 48 and the ring gear 42.

The carrier assembly 44 is operatively connected with an input clutch 52 which is a conventional fluid operated friction device, and with a conventional fluid operated friction clutch 54 which is also operatively connected with the ring gear 24 of the simple planetary gearset 18. Selective engagement of the input clutch 52 will result in power input from the engine and torque converter 12 to the carrier assembly 44. Selective engagement of the connecting clutch 54 will cause the ring gear 24 and the carrier 44 to act as a single unit. Thus, if the connecting clutch 54 and the brake 38 are engaged, both the ring gear 24 and the carrier assembly 44 will be held stationary. Through judicious selection and engagement of the clutches and brakes, the planetary gear arrangement will provide four forward speed ratios and one reverse speed ratio between the engine 12 and the final drive 14.

To establish the first and lowest forward speed ratio, the brake 38 and the clutch 54 are engaged. Thus, the ring gear 24 and carrier assembly 44 are held stationary while the sun gear 22 is driven by the engine and torque converter 12. Due to the ring gear 24 being held stationary, the carrier 26 is driven forwardly at a reduced speed which also drives the sun gear 40 to which is continuously drive connected. The sun gear 40 rotating forwardly drives the ring gear 42 forwardly when the carrier assembly 44 is held stationary. Thus, the first and lowest ratio is provided with a reduced ratio from the simple planetary gearset 18 and the compound pinion planetary gearset 20 before delivery of power to the final drive 14.

To establish the second forward speed ratio, the brake 38 and clutch 54 are disengaged while the brake 34 and clutch 52 are engaged. In the second ratio, the sun gear 40 is held stationary by the brake 34 while input power is provided to the carrier assembly 44 via the clutch 52. With this arrangement, the ring gear 42 will be driven forwardly at a reduced speed but at a speed higher than that of the first ratio.

The third forward speed ratio is provided by maintaining the clutch 52 engaged, disengaging the brake 34 and engaging the brake 38. This will secure the ring gear 24 to the transmission housing 36 such that the carrier 26 will be driven forwardly at a reduced speed which, in turn, will drive the sun gear 40 forwardly at a reduced speed. The carrier assembly 44 is driven forwardly at engine speed thereby increasing the forward speed of the ring gear 42 due to the input speed components of the both the sun gear 40 and the carrier 44.

To establish the fourth forward speed ratio, the friction brake 38 is disengaged while the clutch 54 is engaged. With the clutch 54 and clutch 52 engaged, the planetary gearsets 18 and 20 operate in a 1:1 ratio which results in a direct drive from the engine and torque converter 12 to the final drive 14.

As explained above, it can be seen that three forward underdrive ratios are provided and one direct forward ratio is provided.

To establish the reverse drive ratio, the brake 34 and clutch 54 are engaged while the friction brake 38 and clutch 52 are disengaged. In reverse drive, power is directed to the sun gear 22 for the engine and torque converter 12. With the carrier assembly 26 held stationary by the friction brake 34, the ring gear 24 will rotate in a reverse direction. With the clutch 54 engaged, the carrier assembly 44 will also rotate in a reverse direction at the same speed as the ring gear 24 which is a reduced speed from the input at sun gear 22 The sun gear 40 is held stationary by the friction brake 34, such that the carrier 44 will drive the ring gear 42 in the same direction as the carrier assembly 44 is being driven by the ring gear 24.

As explained above, this is the direction reverse to the engine input rotation. Thus, the ring gear 42 and final drive 14 are driven in the reverse direction. The reverse ratio also obtains its reduction value from both planetary gearsets 18 and 20.

By way example, if the number of teeth on the ring gear 24 divided by the number of teeth on the sun gear 22 is equal to 1.54 and the number of teeth on ring gear 42 divided by the number of teeth on sun gear 40 is equal to 1.714, the following drive ratios will be established:

First ratio=4.35

Second ratio=2.40

Third ratio=1.54

Fourth ratio=1.00

Reverse ratio=3.70.

It is expected that the clutches and brakes will be controlled by a conventional hydraulic pressure system which receives the control signals from a conventional electronic control module. Such control systems are utilized in many of the currently available power transmissions to provide faster and more consistent response in the control system which will accommodate the double transition shift occurring between the first and second ratios.

It should be appreciated from the above description that the four forward speeds and the one reverse speed ratios are provided by two planetary gearsets and four friction devices. This is considered the minimum number of friction devices and planetary gearsets which must be utilized to establish four forward speeds and a reverse speed.

We claim:

1. A power transmission comprising:

a power input shaft;

a power output shaft;

a simple planetary gearset having a first sun gear continuously connected with said power input shaft, a first carrier assembly having a plurality of first pinion gears meshing with said sun gear and a first ring gear meshing with said first pinion gears;

a compound pinion planetary gearset having a second sun gear continuously connected with the first carrier assembly, a second ring gear continuously connected with said power output shaft for delivering power thereto and a second carrier assembly having a plurality of second pinion gears meshing with said second sun gear and a plurality of third pinion gears meshing with said second ring gear and with said second pinion gears;

a first clutch for selectively connecting said second carrier assembly with said power input shaft;

a second clutch for selectively connecting said second carrier assembly with said first ring gear for common rotation;

a first brake for selectively connecting said first ring gear with a stationary transmission housing; and a second brake for selectively connecting said first carrier assembly with said transmission housing, said second clutch being engaged during the establishment of a lowest speed ratio, a highest forward speed ratio and a reverse speed ratio, said first clutch being engaged during two intermediate forward speed ratios and the highest speed ratio.

2. The power transmission defined in claim 1 further wherein said first brake is engaged in the lowest forward ratio and one of the intermediate ratios and said second brake is engaged during said other intermediate ratio and said reverse ratio.

* * * * *